United States Patent [19]

Hyodo et al.

[11] Patent Number: 4,648,164
[45] Date of Patent: Mar. 10, 1987

[54] METHOD FOR FORMING AN ENERGY ABSORBING COUPLING FOR A STEERING WHEEL

[75] Inventors: Yoichi Hyodo, Okazaki; Mitsuru Harata, Nagoya, both of Japan

[73] Assignees: Toyota Jidosha Kabushiki Kaisha; Toyoda Cesei Co., Ltd., both of Japan

[21] Appl. No.: 779,971

[22] Filed: Sep. 25, 1985

[30] Foreign Application Priority Data

Sep. 27, 1984 [JP] Japan .................................. 59-200568

[51] Int. Cl.⁴ ............................................ B21D 53/26
[52] U.S. Cl. ..................................... 29/159 B; 74/492; 74/552; 188/371; 280/777
[58] Field of Search .............. 29/159 B; 280/777, 779, 280/750; 188/371, 372; 74/459, 552

[56] References Cited

U.S. PATENT DOCUMENTS

| 3,242,559 | 3/1966 | Olsen | 29/159 R |
| 3,504,567 | 4/1970 | Susumu et al. | 74/492 |
| 4,312,430 | 1/1982 | Ohtanl | 188/377 |
| 4,390,193 | 6/1983 | Strahan et al. | 74/492 |

Primary Examiner—Howard N. Goldberg
Assistant Examiner—P. W. Echols
Attorney, Agent, or Firm—Parkhurst & Oliff

[57] ABSTRACT

A method for forming an energy absorbing coupling for connecting a steering wheel to a steering shaft is provided. The energy absorbing coupling is formed from a deformable member, a junction to the steering wheel and a junction to the steering shaft, each of which are formed as separate members. The deformable member includes a deformable part which functions to absorb energy from the force of an impact on the steering wheel. The deformable member is formed by bending without drawing. Work hardening effects of drawing are therefore avoided. The energy absorbing coupling formed has stable energy absorbing characteristics.

12 Claims, 9 Drawing Figures

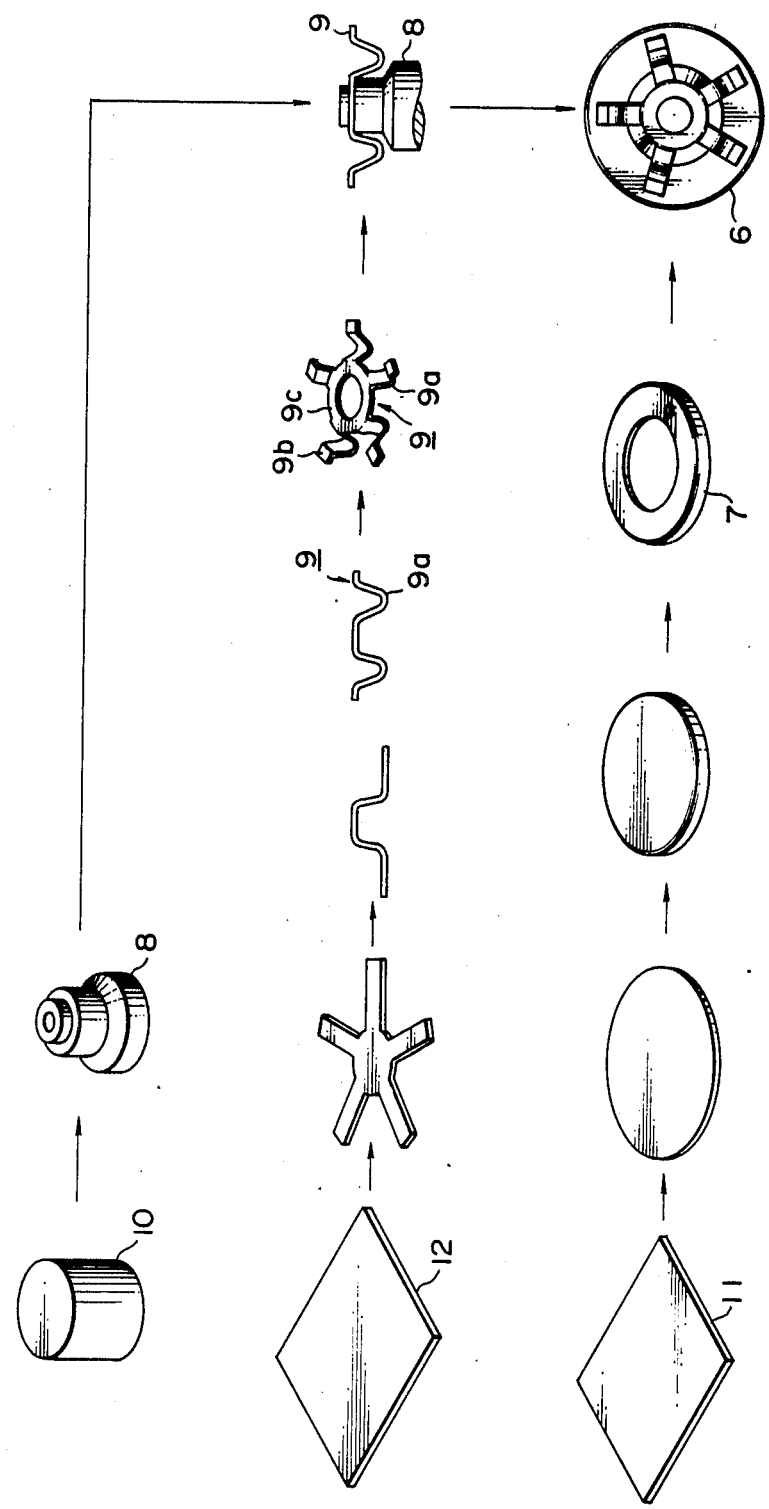

PRIOR ART FIG. 8
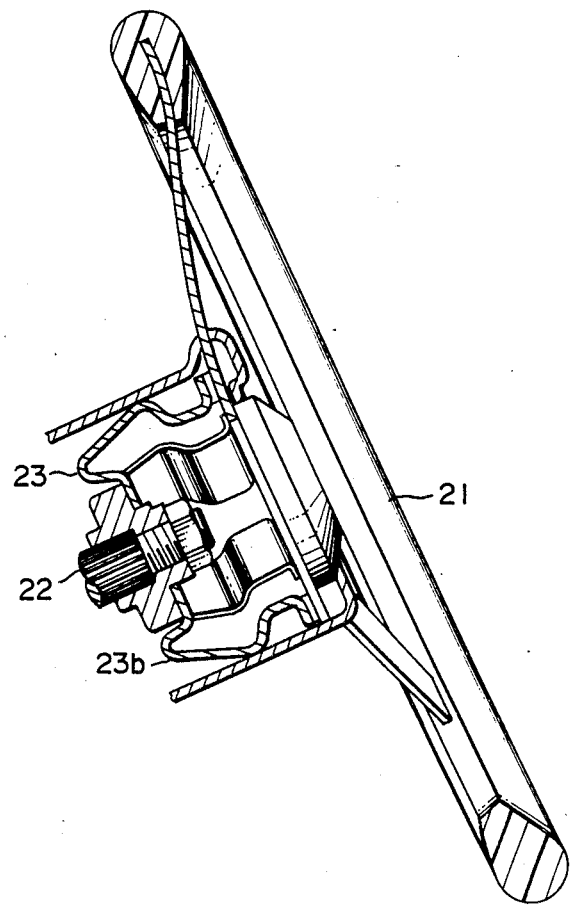
PRIOR ART FIG. 9
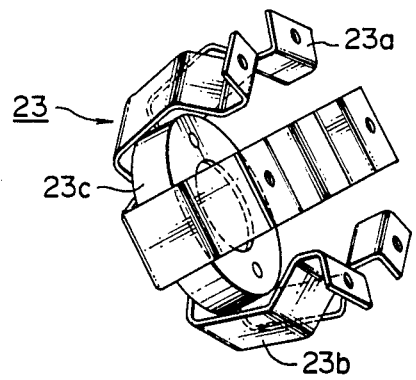

METHOD FOR FORMING AN ENERGY ABSORBING COUPLING FOR A STEERING WHEEL

BACKGROUND OF THE INVENTION

1. Field of the Invention

The present invention relates to a method for forming a coupling which connects an auto steering wheel with an auto steering shaft. Specifically, the present invention relates to a method for forming an energy absorbing coupling which can absorb the impact energy of a force applied to the steering wheel of an automobile.

2. Description of the Prior Art

In recent years, a contractable shock-absorbing steering shaft which can absorb the impact energy from a force applied to a steering wheel and a steering wheel equipped with a self-aligning mechanism which can change the support direction of the steering wheel and can thereby absorb energy from an applied force have come to be widely employed in auto steering systems.

The energy absorbing mechanism including the self-aligning mechanism is constructed as illustrated, for example, in FIGS. 8 and 9 (U.S. Pat. No. 4,390,193). In this self-aligning mechanism, steering wheel 21 and steering shaft 22 are connected by an energy absorbing coupling 23 which by deforming itself can absorb the energy of an applied force.

In this type of energy absorbing coupling 23, the flange 23a which is a junction to the steering wheel, the deformable member 23b for energy absorption and the boss 23c which is a junction to the steering shaft are integrated. The transitional part from the deformable member 23b to the boss 23c especially is formed from an integral piece by press-drawing.

Generally speaking, when a piece is drawn, a work-hardening of the piece to a certain extent occurs. Thus, when press-drawn, the deformability of the deformable member 23b which absorbs the energy deteriorates through the work-hardening and it is liable to fail in exhibiting the desired stable energy absorbing characteristics. To avoid this trouble due to work-hardening, the use of an annealing process would be necessary. However, annealing would lower productivity and lead to an increased cost in production.

SUMMARY OF THE INVENTION

An object of the present inventon is to provide a new method for forming an energy absorbing coupling to be used in a self-aligning mechanism, thereby stabilizing the energy absorbing characteristics of the coupling and at the same time decreasing the production cost while increasing productivity.

To accomplish the above object, an energy absorbing coupling is provided which connects the steering wheel and the steering shaft and which absorbs the impact energy of a force applied to the steering wheel by deforming itself.

The energy absorbing coupling is formed from three separate members, i.e., a deformable member including a part which deforms to absorb energy, a junction which is connected to the steering wheel and a junction which is connected to the steering shaft. The deformable part is molded by being bent without being drawn. The deformable member, the junction to the steering wheel and the junction to the steering shaft, each of which are separately formed, are then joined together to form a complete energy absorbing coupling with a specified configuration.

According to this method, the deformable member including an energy absorbing part which is formed separately from the junction to the steering wheel and the junction to the steering shaft can easily and individually be bent.

In the deformable part which is formed by bending alone without being drawn, no work-hardening occurs and accordingly the desired stable energy absorbing characteristics can be obtained. Thus, there is no need for an additional annealing step to correct the work-hardening. The coupling can be produced by a simple process in which the conventional drawing process is replaced with a bending technique, thereby elevating the productivity and reducing the production cost.

BRIEF DESCRIPTION OF THE DRAWINGS

The above object, features and advantages of the present invention will become apparent and will be more readily appreciated from the following detailed description of exemplary embodiments of the present invention, taken in conjunction with the accompanying drawings, wherein:

FIG. 6 is a flow diagram illustrating a process for the production of the device in FIG. 1;

FIG. 8 is a cross-sectional view of the conventional energy absorbing device shown in U.S. Pat. No. 4,390,193; and FIG. 9 is a view of the coupling in FIG. 8.

DETAILED DESCRIPTION OF THE PREFERRED EMBODIMENTS

Figure 1:
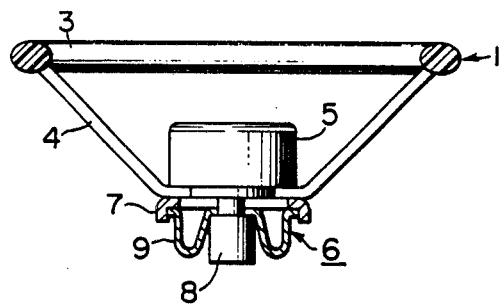
FIG. 1 is a partial cross-sectional view of a device including an energy absorbing coupling for a steering wheel.

FIGS. 1 to 5 illustrate one embodiment of the invention of a self-aligning mechanism including an energy absorbing coupling. A steering wheel 1 is composed of a steering wheel ring 3, a steering wheel spoke 4 and a steering wheel pad 5. The steering shaft 2 is coupled to the front wheels of the auto through a suitable transmission mechanism.

An energy absorbing coupling 6 connects the steering wheel 1 to the steering shaft 2.

The energy absorbing coupling 6 is designed so as to be able to absorb the energy of a shock applied to the steering wheel 1 by deforming itself and this energy absorbing coupling 6 constitutes a self-aligning mechanism of the steering wheel. The energy absorbing coupling 6 is composed of a boss plate 7 which is the connection to the steering wheel 1, a boss 8 which is the connection to the steering shaft 2, and a deformable member 9 including a deformable part 9a which connects the boss plate 7 to the boss 8 and which absorbs impact energy by deforming itself. These members 7, 8 and 9 are separately formed and then joined together to form the complete energy absorbing coupling 6.

In this embodiment of the invention, the deformable member 9 consists of deformable part 9a, the connection 9b to the boss plate 7 and the connection 9c to the boss 8. The deformable part 9a in the deformable member 9 extends radially from the boss 8 to the boss plate 7. Connections 9b and 9c are located at the ends of the deformable member 9 and they are welded to the boss plate 7 and boss 8, respectively. The deformable part 9a is bent into a "U" shape between the connections 9b and 9c. The boss plate 7 and the boss 8 are designed to be rigid enough so that they will not deform under a small external force, but the deformable part 9a is designed so as to be deformable by a small load.

The energy absorbing coupling 6 thus constituted is manufactured as illustrated in FIG. 6.

To form the energy absorbing coupling, the boss 8, the deformable member 9 and the boss plate 7 are formed as separate members. As illustrated in FIG. 6, the boss 8 is machined from, for example, a round bar 10 such as a block (for instance S25C). However, depending on the end shape desired, the boss 8 may be blanked from a plate and then bent to the final shape. The boss plate 7 is molded by blanking a broad ring out of, for example, plate 11 (first instance, SPHC, 2.6 mm thick), flange-bending it and finally punching it.

The deformable member 9 is molded by radially blanking, for example, a plate (for instance SPHC, 3.2 mm thick), bending the blanked piece to a "U" shape in two stages and finally punching it. The boss 8 and the deformable member 9 thus molded to a required shape are then circumferentially welded. Thereafter, the deformable member 9 and the boss plate 7 are joined by welding to complete the energy absorbing coupling 6.

In the process for forming the deformable member 9, the "U" shaped deformable part 9a which absorbs the energy is formed by bending alone without use of a conventional drawing technique. Consequently, the stable energy absorbing characteristics desired can be obtained because, being free from work-hardening which originates from the conventional drawing technique, the plate 12 or its "U" shaped configuration ensures the stability of the elastic deformability characteristics.

Figure 7:
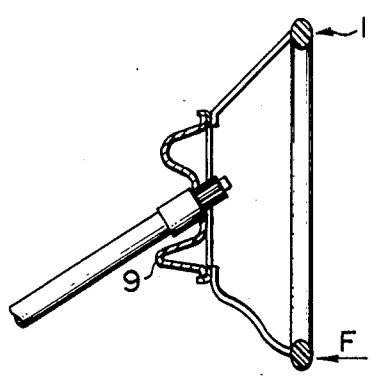
FIG. 7 is a partial cross-sectional view illusrating a deformation of the device of FIG. 2 after a force F acts on it.

Thus, as seen from FIG. 7, when an impact force F is applied to the steering wheel 1, the deformable part 9a of the energy absorbing coupling 6 will deform in such a manner that it mitigates the impact force F in the direction of the application of the force. The shock energy of the force applied to the steering wheel 1 is absorbed by the deformable part 9a because of the maintenance of the deformability characteristics of the deformable part 9a.

Figure 2:
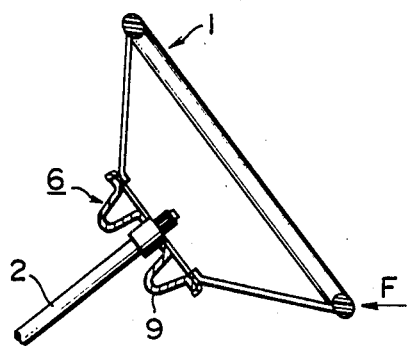
FIG. 2 is a partial cross-sectional view of the device in FIG. 1 shown as an impact force is applied.
Figure 3:
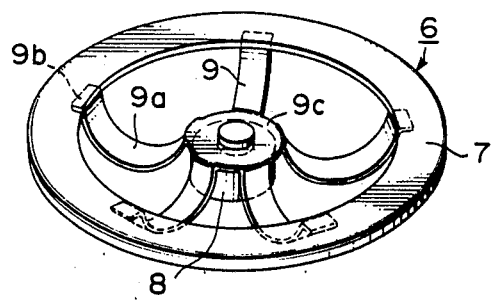
FIG. 3 is an enlarged view of the device in FIG. 1.
Figure 4:
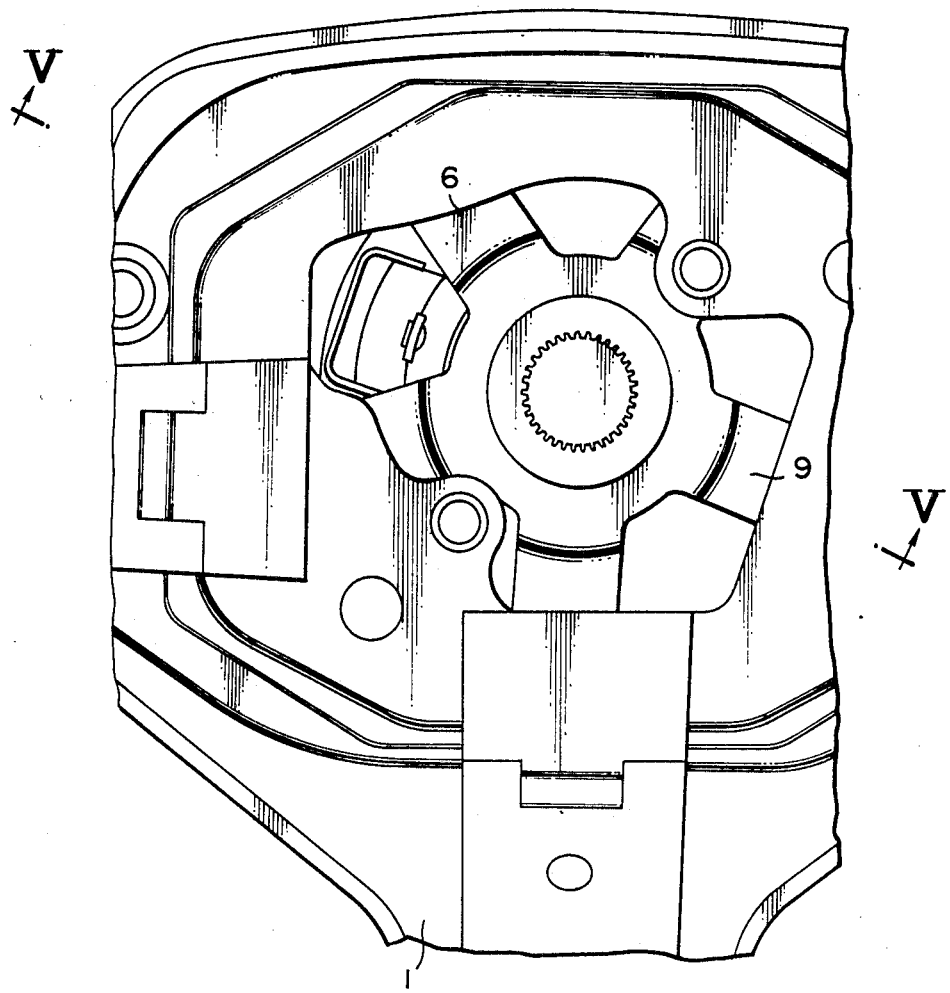
FIG. 4 is an enlarged plan view of the device in FIG. 1.
Figure 5:
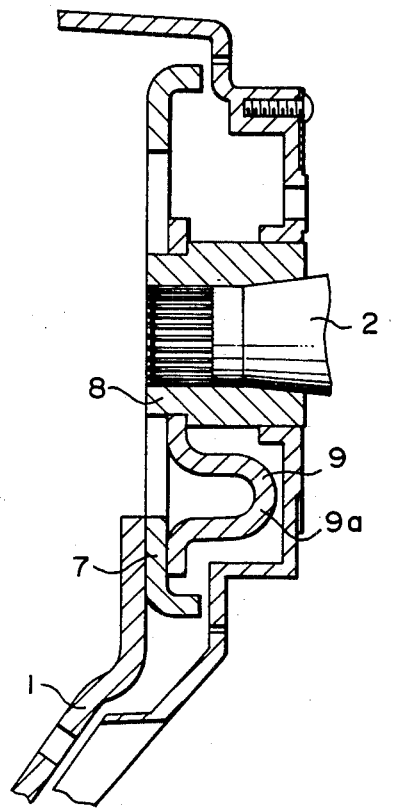
FIG. 5 is a sectional view along the line V—V in FIG. 4.

FIGS. 2 and 7 illustrate a state of deformation and a state of recovery from deformation when an impact force F is applied. The impact force F acting on the steering wheel ring 3 is transmitted from the steering wheel spoke 4 via the boss plate 7 to the deformable part 9a of the deformable member 9. The deformable part 9a functions as an energy absorbing plate and it is elastically deformed as shown in FIG. 7. After the removal of the force F, the deformable part recovers from the deformation as illustrated in FIG. 2, thus performing a self-aligning function. It should be noted that the steering wheel spoke 4, which can be deformed by a load larger than the load that deforms the deformable part 9a, also performs a shock-abating function.

Thus, the function of the deformable part 9a in bending to absorb the energy from an impact force can be improved by separately molding the different members in the energy absorbing coupling 6. Stable energy absorbing characteristics of the deformable part 9a can be achieved by molding the deformable part 9a by bending alone without resorting to drawing. Since an annealing process to stabilize the energy absorbing characteristic is needless and the desired energy absorbing characteristics can be obtained simply by bending, the molding method is simplified and the productivity is enhanced and the production cost is reduced.

Although only preferred embodiments of the present invention have been described in detail, it will be appreciated by those skilled in the art that various modifications and alterations can be made to the particular embodiments shown without materially departing from the novel teachings and advantages of the invention. Accordingly, it is to be understood that all such modifications and alterations as defined by the following claims are included within the scope of the invention.

What we claim is:

1. A method for forming an energy absorbing coupling for a steering wheel, which connects said steering wheel and a steering shaft and which can absorb impact energy from a force applied to said steering wheel by deforming itself, said method comprising the steps of:
   forming separate members to form said energy absorbing coupling, said separate members comprising a deformable member including a deformable part to absorb said impact energy, a first junction between said steering wheel and said deformable member and a second junction between said steeing shaft and said deformable member, positioning said deformable part of said deformable member so that it extends in a radial direction of said steering shaft;
   forming said deformable part in said deformable member by bending without drawing, said deformable part having at least one free end during said bending; and
   joining said deformable member, said first junction and said second junction to form said energy absorbing coupling.

2. The method for forming an energy absorbing coupling for a steering wheel of claim 1, wherein said deformable part in said deformable member is bent into a "U" shape.

3. The method for forming an energy absorbing coupling for a steering wheel of claim 2, wherein said deformable part in said deformable member is bent in two stages into said "U" shape.

4. The method for forming an energy absorbing coupling for a steering wheel of claim 1, wherein said deformable member consists of said deformable part, a connection to said first junction and a connection to said second junction.

5. The method for forming an energy absorbing coupling for a steering wheel of claim 1, wherein said deformable part in said deformable member is designed to extend radially from said first junction to said second junction.

6. The method for forming an energy absorbing coupling for a steering wheel of claim 1, wherein said deformable member is molded by blanking a plate thereby producing a blanked piece and then bending said blanked piece.

7. The method for forming an energy absorbing coupling for a steering wheel of claim 1, wherein said first junction is formed into a ring-like member.

8. The method for forming an energy absorbing coupling for a steering wheel of claim 1, wherein said first junction is formed by blanking a plate to form a blanked piece and then flange-bending said blanked piece.

9. The method for forming an energy absorbing coupling for steering wheel of claim 1, wherein said second junction is formed by machining a block.

10. The method for forming an energy absorbing coupling for a steering wheel of claim 1, wherein said second junction is formed from a plate.

11. The method for forming an energy absorbing coupling for a steering wheel of claim 1, wherein said deformable member, said first junction and said second junction are joined by welding.

12. A method for forming an energy absorbing coupling for connecting a steering wheel to a steering shaft which can absorb impact energy from a force applied to said steering wheel by deforming itself, said method comprising the steps of:

forming a deformable member including a deformable part to absorb said impact energy, a first junction between said steering wheel and said deformable member and a second junction between said steering shaft and said deformable member, said deformable part being formed by blanking a plate thereby producing a blanked piece and then bending said blanked piece into a "U" shape, positioning said deformable part of said deformable member so that it extends in a radial direction of said steering shaft, at least a first end of said deformable part being free during said bending, said first junction being formed from a ring-shaped member, said second junction being formed by machining a block; and joining said deformable member, said first junction and said second junction to form said energy absorbing coupling.

* * * * *